US010712776B2

(12) United States Patent
Choi (10) Patent No.: US 10,712,776 B2
(45) Date of Patent: Jul. 14, 2020

(54) DISPLAY TERMINALS AND WEARABLE DEVICES

(71) Applicant: Advance Technology (International) Company Limited, Hong Kong (HK)

(72) Inventor: Siu Chung Choi, Hong Kong (HK)

(*) Notice: Subject to any disclaimer, the term of this patent is extended or adjusted under 35 U.S.C. 154(b) by 0 days.

(21) Appl. No.: 16/536,774

(22) Filed: Aug. 9, 2019

(65) Prior Publication Data

US 2020/0050237 A1 Feb. 13, 2020

(51) Int. Cl.
*G06F 1/16* (2006.01)
*F21V 33/00* (2006.01)

(52) U.S. Cl.
CPC .......... *G06F 1/163* (2013.01); *F21V 33/0052* (2013.01); *G06F 1/1652* (2013.01); *G06F 1/1686* (2013.01)

(58) Field of Classification Search
CPC combination set(s) only.
See application file for complete search history.

(56) References Cited

U.S. PATENT DOCUMENTS

| 7,558,057 | B1* | 7/2009 | Naksen | G06F 1/1613 |
| | | | | 361/679.3 |
| 9,606,654 | B2* | 3/2017 | Li | G06F 3/015 |
| 9,807,875 | B2* | 10/2017 | Hiroki | H05K 1/147 |
| 9,807,893 | B2* | 10/2017 | Li | G06F 1/1652 |
| 9,848,494 | B2* | 12/2017 | Huitema | H05K 1/183 |
| 9,980,402 | B2* | 5/2018 | Huitema | G09F 9/301 |
| 10,061,350 | B2* | 8/2018 | Magi | A44C 5/0069 |
| 10,185,364 | B2* | 1/2019 | Seo | G06F 1/1652 |
| 10,289,163 | B2* | 5/2019 | Huitema | G06F 1/163 |
| 10,318,129 | B2* | 6/2019 | Inagaki | G06F 1/1626 |
| 10,338,638 | B2* | 7/2019 | Park | G06F 1/1656 |
| 10,338,641 | B2* | 7/2019 | Xia | G06F 1/1681 |
| 10,481,638 | B2* | 11/2019 | Yoshizumi | G06F 1/163 |
| 2006/0209218 | A1* | 9/2006 | Lee | G04G 9/00 |
| | | | | 349/1 |
| 2015/0185944 | A1* | 7/2015 | Magi | G06F 1/1652 |
| | | | | 345/174 |
| 2015/0186092 | A1* | 7/2015 | Francis | H04W 4/80 |
| | | | | 345/520 |
| 2015/0186705 | A1* | 7/2015 | Magi | G06K 9/0002 |
| | | | | 382/125 |

(Continued)

FOREIGN PATENT DOCUMENTS

| CN | 101924816 B | 3/2013 |
| CN | 203119972 U | 8/2013 |
| CN | 107370852 A | 11/2017 |

*Primary Examiner* — Lisa Lea-Edmonds
(74) *Attorney, Agent, or Firm* — W&K IP (57) ABSTRACT

The invention discloses a display terminal and a wearable device, which are configured to solve the problem that the existing device is inconvenient to be used. A display terminal comprises: a hard body, configured to mount components; two bendable parts, respectively located on two sides of the hard body and spliced on a plane to form a bendable body; a flexible display, covering the outer surface of the hard body and the bendable body. When full screen is not required, the flexible display can be bent along with the bendable parts. At this time, information can be displayed only on the flexible display which is on the hard body, and when full screen is required, the two bendable parts unfolded, the flexible display is unfolded to achieve full screen.

20 Claims, 5 Drawing Sheets

(56) References Cited

U.S. PATENT DOCUMENTS

| | | | |
|---|---|---|---|
| 2016/0209875 A1* | 7/2016 | Kim | G06F 1/1652 |
| 2016/0320796 A1* | 11/2016 | Magi | G06K 9/0002 |
| 2019/0230803 A1* | 7/2019 | Liao | A44C 5/00 |
| 2019/0235579 A1* | 8/2019 | Wu | G09G 3/20 |
| 2019/0250669 A1* | 8/2019 | Liao | G04G 17/00 |
| 2020/0042037 A1* | 2/2020 | Sun | G06F 1/1652 |

\* cited by examiner

DISPLAY TERMINALS AND WEARABLE DEVICES

CROSS-REFERENCE TO RELATED APPLICATIONS

This application claims priority to HONG KONG Patent Application No. 18110356.7 with a filing date of Aug. 13, 2018. The content of the aforementioned application, including any intervening amendments thereto, are incorporated herein by reference.

TECHNICAL FIELD

The invention belongs to the field of intelligent and reality equipment, such as mobile phones, watches and other devices with display functions, in particular, display terminals and wearable devices.

BACKGROUND

The existing display terminal use hard screens more widely. With the appearance of flexible displays, a mobile phone with a flexible display appears, and the prior art is as follows:

A flexible mobile phone, CN101924816B, comprising: a flexible body, the flexible body comprises a call system, the call system is disposed inside the flexible body; and a flexible display, the flexible display is disposed on the surface of the flexible body; wherein the flexible mobile phone further comprises a flexible touch display disposed on the surface of the flexible display, the flexible touch display comprising at least one transparent conductive layer, the transparent conductive layer comprising a carbon nanotube layer. The flexible mobile phone provided by the embodiment of the present invention has the following advantages: the flexible mobile phone of the present invention uses a carbon nanotube layer as a transparent conductive layer of the touch display, and the carbon nanotube layer has excellent mechanical properties, such as good flexibility and bending resistance, which makes the flexibility and bending resistance of the entire flexible phone improved.

A portable flexible mobile phone, CN107370852A, discloses a portable flexible mobile phone for solving the problem that the flexible mobile phone maintains an annular shape after being bent. In the method of the embodiment of the present invention, when the main body of the mobile phone is in a straight state, the first fixing plug of the connecting rod is movably connected with the first positioning hole of the main body of the mobile phone, and the second fixing plug of the connecting rod fits with the interference of the second positioning hole of the main body of the mobile phone. The first connecting plug of the connecting rod can be movably connected to the first positioning hole, and the second fixed plug has an interference fit with the second positioning hole, so that the main body of the mobile phone is kept in a curved state, the structure is simple, the carrying is convenient, and the hardware cost is low. At the same time, the flexible mobile phone further comprises a flexible outer casing, which can prevent the mobile phone from being damaged when the mobile phone collides or rubs against an external object.

A wristband type multifunctional flexible mobile phone. CN203119972U, the wristband type multifunctional flexible mobile phone of the utility model comprises: a flexible display, a rubber casing, an airbag, a flexible printed circuit board, a back plate, a battery pack, a non-reducible curved hard shell I, a non-reducible curved hard shell II and a processor; the flexible display is arranged in front of the rubber shell, the back plate is arranged behind the rubber shell, and the airbag, the flexible circuit board and the battery pack are arranged in the rubber shell. One end of the rubber shell is provided with a non-reducible curved hard shell I, the other end of the rubber shell is provided with a non-reducible curved hard shell II. And the processor is arranged in the non-reducible curved hard shell I and the non-reducible curved hard case II; the processor is connected to the flexible display and the battery pack through the flexible circuit board, and the battery pack is embedded in the card slot of the rubber shell. The inflatable flexible display is made of AMOLED flexible material, and the back plate is a structure of an electronic ink screen, an AMOLED flexible display or a decorative surface. The battery pack uses a FLCB flexible battery or a flexible zinc battery. An adapter and a headphone interface are arranged on the non-reducible curved hard shell I; the non-reducible curved hard shell II is provided with an earpiece, a camera, a data line interface and a main switch. The wristband type multifunctional flexible mobile phone of the utility model has the characteristics of simple structure, reasonable design, beautiful appearance, portability and multi-purpose. When the hand strap state is present, the outer side can display important information and decorative feature, as well as function with quick operation, or a decorative surface carrying the jewelry design, can better reflect the characteristics of intelligence and jewelry. At the same time, it can replace traditional watches.

Figure 1:
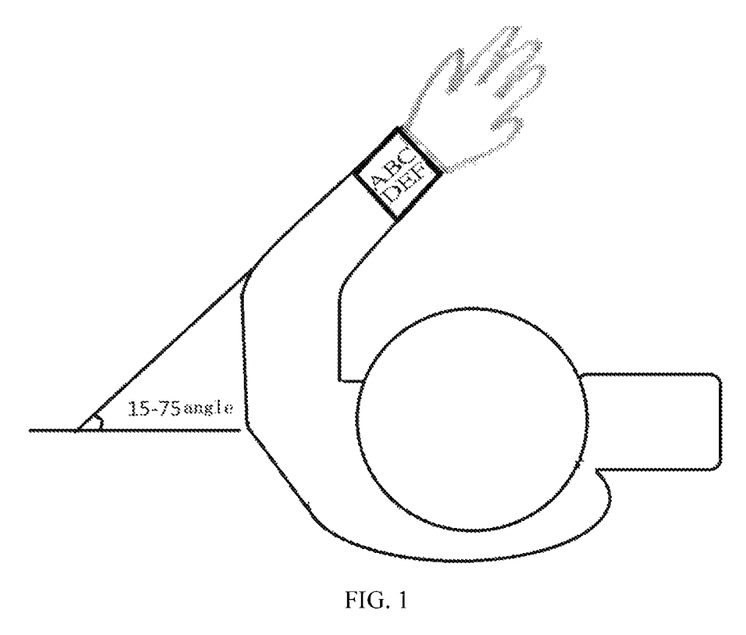
FIG. 1 is a schematic diagram showing the use state 1 of the wearable device with flexible display in the prior art.
Figure 2:
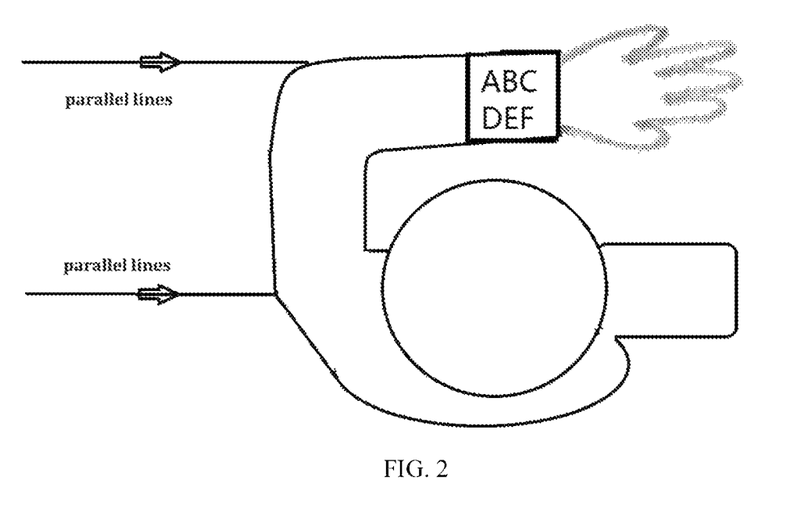
FIG. 2 is a schematic diagram showing the use state 2 of the wearable device with flexible display in the prior art.

In the prior art, the application of the flexible display adopts a structure of full flexible display, and the shape of most of the existing smart phones are right angle quadrilateral. If the right angle quadrilateral phone is worn directly on the wrist to the forearm, the phone is on the same line as the wrist and forearm. From the basic structure of the human body, when the mobile phone is placed directly in front of the user's line of sight, the comfortable angle of the wrist to the forearm and the shoulders of the human body is usually between 15 and 75 degrees (FIG. 1), so whether the mobile phone is straight or put it horizontally on the wrist to the forearm. The straight line between the mobile phone and the "wrist/forearm" and the shoulder line form a slope of 15-75 degrees, which causes the phone to be placed obliquely in front of the user. A mobile phone that is placed obliquely will naturally have many problems in use, such as inconvenient reading. It is not comfortable to put the wrist and forearm in line with the user's front by turning the elbow (FIG. 2). Long-term use can cause the user's "wrist/arm" to be easily fatigued, joint strain and the like.

SUMMARY

It is an object of the present invention to provide a display terminal and a wearable device for solving the problem of inconvenient use of existing devices.

To achieve the above technical purpose, the technical solution adopted by the present invention is as follows;

A display terminal, comprising:

a hard body, configured to mount components;

two bendable parts, respectively located on two sides of the hard body and spliced on a plane to form a bendable body;

a flexible display, covering the outer surface of the hard body and the bendable body.

The present invention is realized in that the flexible display can be bent along with the bendable part when the full screen is not required, and at this time, the information can be displayed only on the flexible display which is on the hard body; and when the full screen is required, the two bendable parts are unfolded, the flexible display is unfolded to achieve full-screen display.

Further, the flexible display is rectangular when the bendable part is not bent.

Further, the hard body is disposed obliquely with respect to a rectangular side of the flexible display, and the shape of the two bendable parts are all triangular or trapezoidal, or the shape of one of the two bendable parts is triangular, the shape of the other is trapezoidal.

Further, the hard body has a band shape.

Further, one end of the hard body is provided with a camera.

Further, the camera is photographed toward the longitudinal direction of the hard body.

Further, the camera is disposed at a corner of the hard body.

Further, one end of the hard body is provided with an lamp source for light.

Further, the lamp source is disposed at a corner of the hard body.

Further, the bendable part is made of plastic or metal.

Further, the bendable part is a memory plastic, a memory metal or a memory alloy.

Further, the inner or the surface of the two bendable parts is provided with flexible components or small components.

A wearable device, comprising:
any of the display terminal described above.
a wearable part;
the hard body is mounted on the wearable part.

Further, the wearable part is of an annular structure and the longitudinal direction of the hard body is parallel to the axis of the wearable part.

Compared with the prior art, the invention has the following effects:

First, the structure is simple, and it is convenient for users to use.

Second, the large area display and small area display of the screen can be realized.

BRIEF DESCRIPTION OF THE DRAWINGS

The invention may be further illustrated by the non-limiting examples given in the drawings.

The symbol of the main components is described below:
1 hard body
2 bendable part
3 flexible display
4 camera
5 lighting source
6 wearable parts

DETAILED DESCRIPTION OF EMBODIMENTS

In order to enable a person skilled in the art to better understand the present invention, the technical solutions of the present invention will be further described below in conjunction with the drawings and embodiments.

Figure 3:
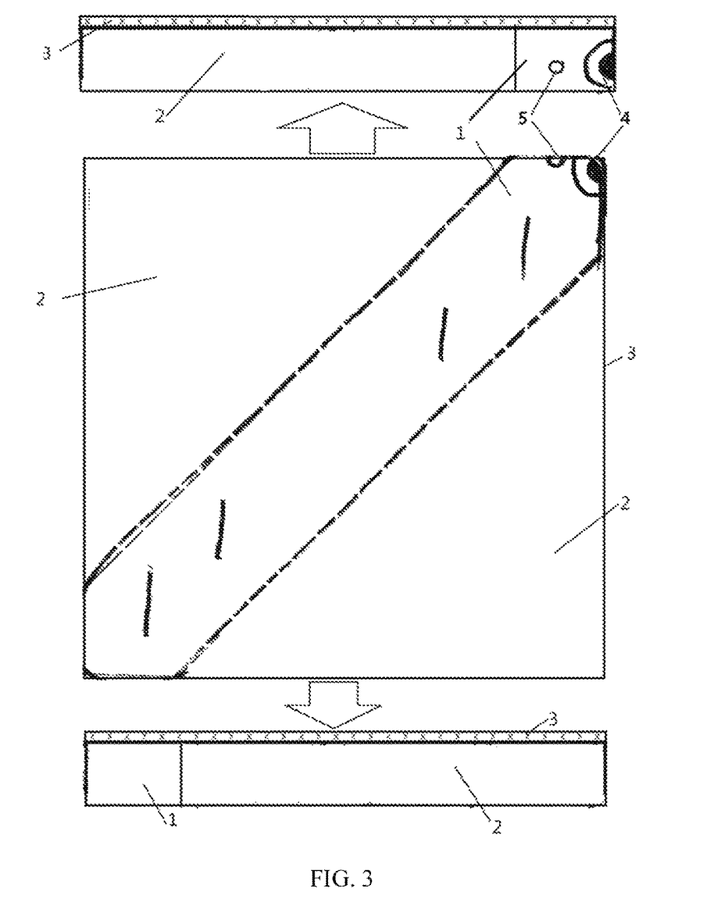
FIG. 3 is an exploded view showing Embodiment 1 of the display terminal of the present invention.

Embodiment 1, as shown in FIG. 3, a display terminal includes:

a hard body 1 is configured to mount components; mounted hardware components such as various chips, antennas, circuit boards, batteries, vibration motors, switch buttons of mobile phone, cameras, flashlights, charging sockets, Sim card slots, memory card slots, headphone jacks, volume adjustment buttons, connectors, etc.

two bendable parts 2, which is made of plastic or metal such as memory plastic, memory metal or memory alloy, etc., and the two bendable parts 2 are respectively located on two sides of the hard body 1 and spliced on a plane to form a set of bendable bodies;

A flexible display 3, covering the outer surface of the hard body and the bendable body.

The shape of the flexible display 3 is rectangular when the bendable part is not bent.

The hard body 1 is disposed obliquely with respect to the flexible display, and the shapes of the two bendable parts 2 are all triangular.

When full screen is not required, the flexible display 3 can be bent along with the bendable part 2, at which time information can be displayed only in the part of the flexible display 3 that is attached to the hard body 1; when full screen is required, the two bendable parts 2 are unfolded, and the flexible display 3 is unfolded to realize full screen. Specifically, the bendable body can be bent by various instructions including, but not limited to, electronics, current, temperature, humidity, without touch or with touch. When it is not necessary to enter the "reading mode", the two bendable parts are automatically affixed and wrapped around any position of the wrist to the forearm to achieve the purpose of automatically wearing; and in need of entering the "reading mode", the two bendable parts can be unfolded into a full screen. This change can also be achieved via methods controlled by machine such as motor drive and gear pushing. Of course, it can also be achieved with human power.

When the display terminal of Embodiment 1 is worn on the wrist, the problem of the inclination angle formed by the "wrist/arm" and the straight line of the human body is overcome. The human body structure "wrist/arm" and the human shoulder line are not a pair of parallel lines. When the mobile phone is held in front of the user's line of sight, the "wrist/arm" can be placed comfortably, the angle between the "wrist/arm" and the line of the shoulders of the human body is usually between 15 and 75 degrees. By designing the oblique parallel lines and their screen unfolded and bent, the present invention achieves the goal of being able to display in full screen on the terminal worn by the "wrist/arm". The existing design concept of the electronic device worn on the wrist is purely based on a rectangular quadrilateral screen, whether it is a projection method, a flexible display 3 wearable method or a pure hard screen wearable method, and they can't overcome the problem that the content displayed on the screen is oblique to the person's line of sight.

Figure 8:
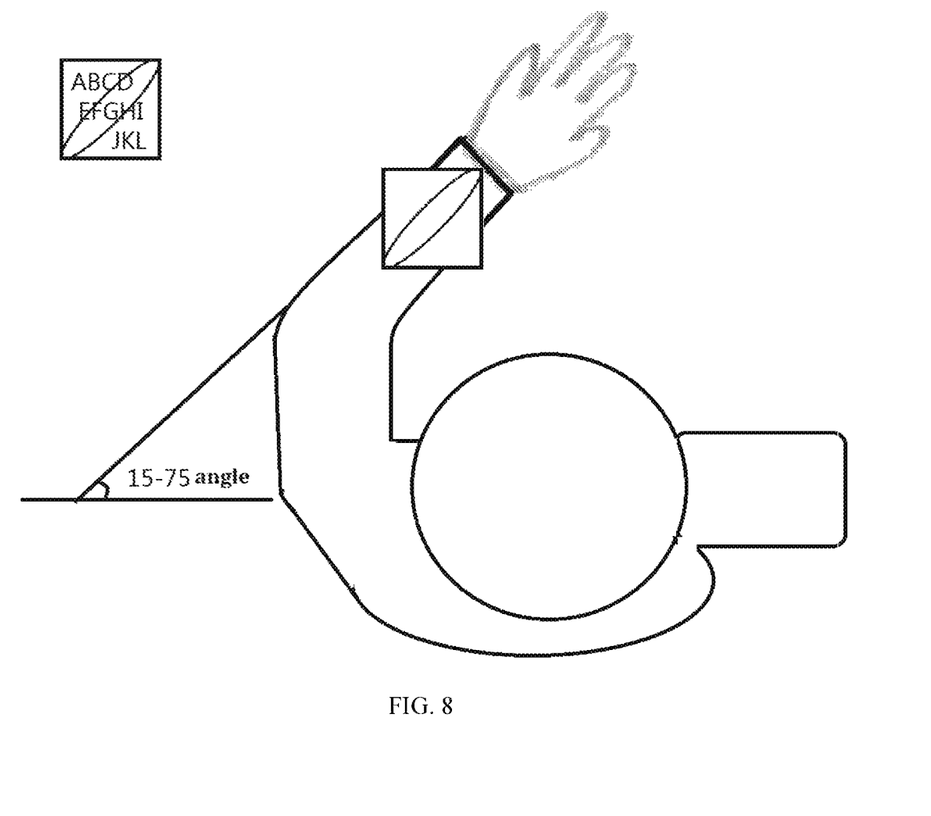
FIG. 8 is a comparison diagram showing a font display and non-display on a flexible display when the bendable is unfolded in the wearable device according to embodiment 1 of the present invention.

As shown in FIG. 8, when the flexible display 3 is unfolded, the font arrangement can be arranged in the horizontal direction of the full screen.

Figure 9:
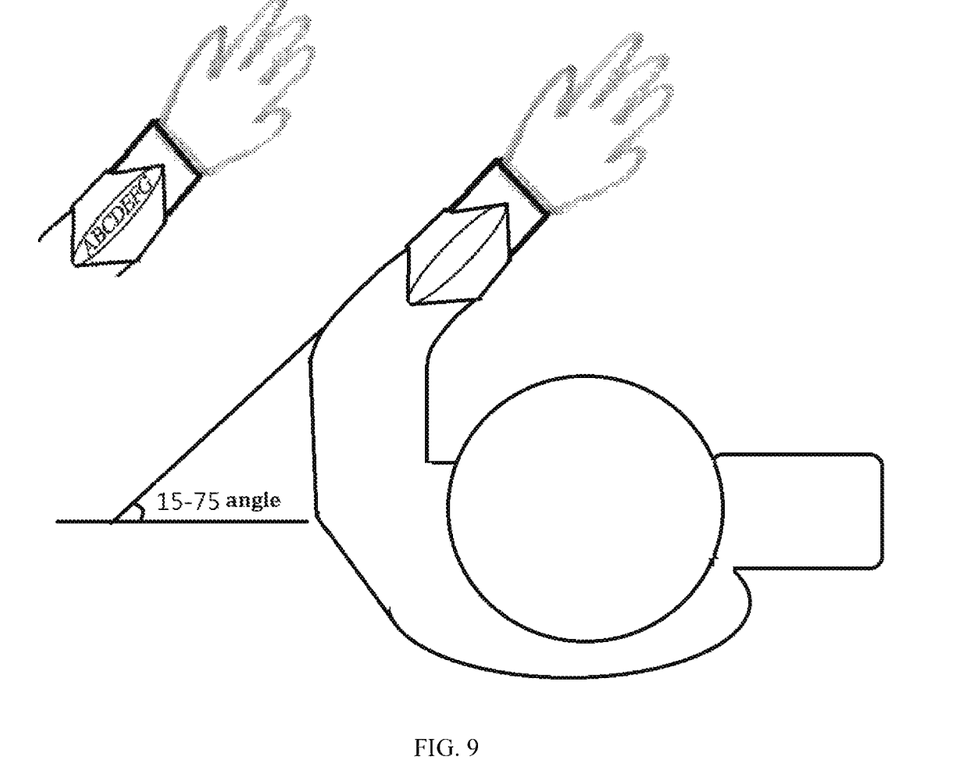
FIG. 9 is a comparison diagram showing a font display and non-display on a flexible display when the bendable is bent according to embodiment 1 of the present invention.
Figure 10:
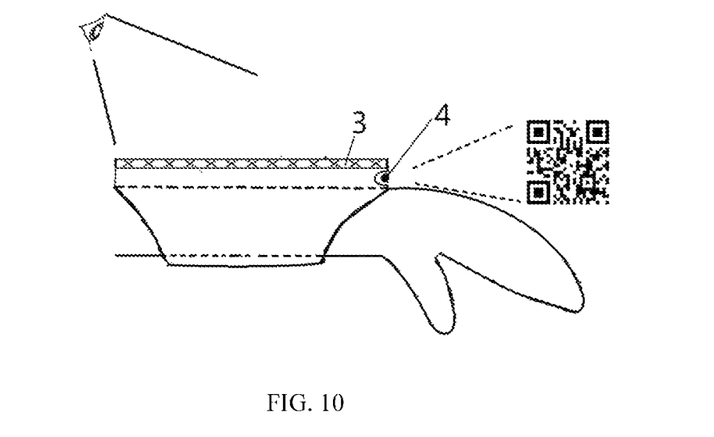
FIG. 10 is a schematic diagram showing the use of the wearable device according to Embodiment 1 of the present invention.

As shown in FIG. 9, when the flexible display 3 is bent, the font arrangement can be arranged only at the position of the flexible display corresponding to the hard body 1, and the fonts are arranged along the length direction of the hard body 1.

Figure 4:
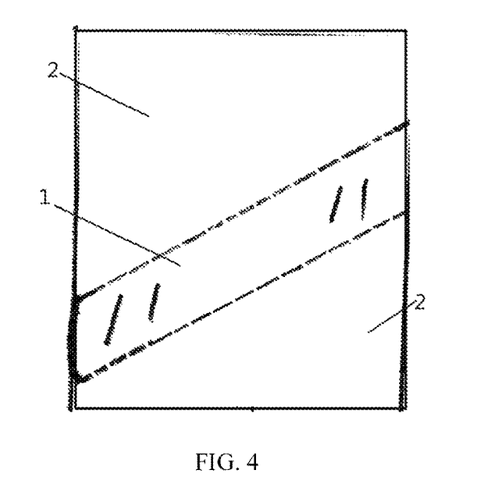
FIG. 4 is a schematic diagram showing Embodiment 2 of the display terminal of the present invention.

The difference between Embodiment 2 and Embodiment 1 is that the hard body 1 is set at a tilt relative to the screen. In FIG. 4, the angle between the hard body 1 and the horizontal direction is smaller than that in FIG. 3.

Figure 5:
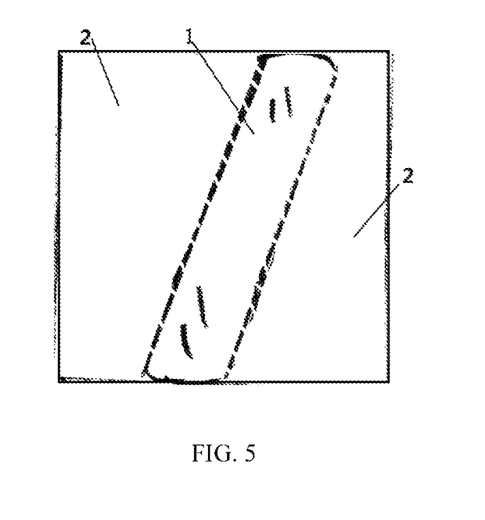
FIG. 5 is a schematic diagram showing Embodiment 3 of the display terminal of the present invention.
Figure 6:
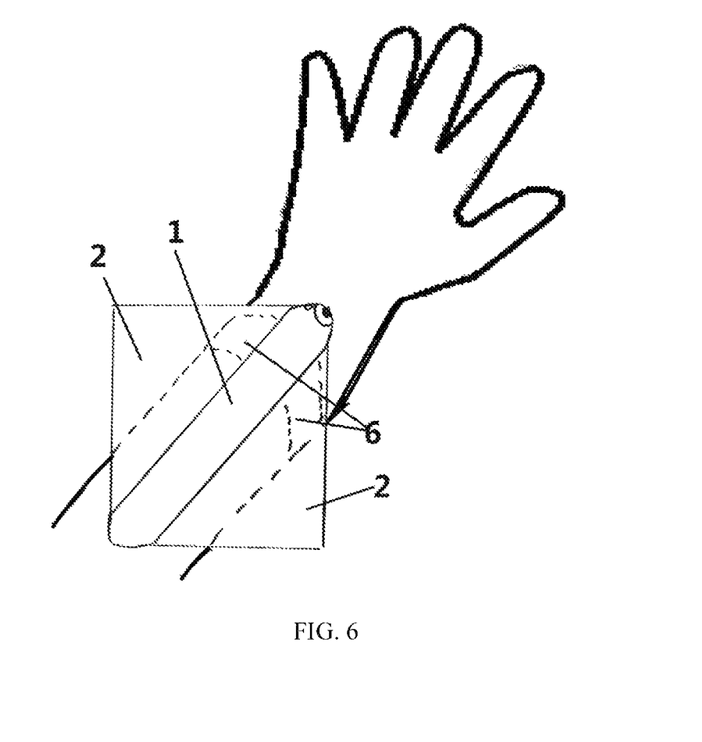
FIG. 6 is a schematic view showing the wearable device of embodiment 1 of the present invention when the bendable body is unfolded.
Figure 7:
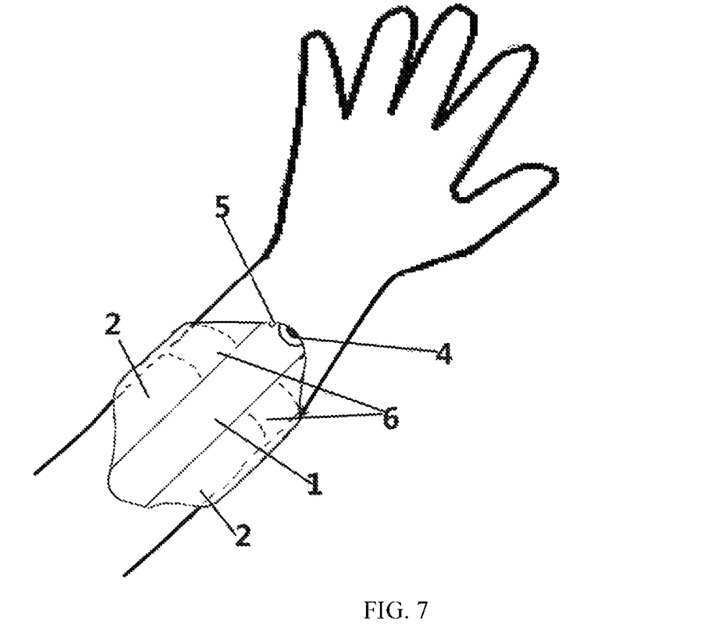
FIG. 7 is a schematic view showing the wearable device of embodiment 1 of the present invention when the bendable body is bent.

The difference between Embodiment 3 and Embodiment 1 is that the hard body 1 is set at a tilt relative to the screen. In FIG. 5, the angle between the hard body 1 and the horizontal direction is larger than that in FIG.

In another embodiment, the hard body 1 is set at a tilt relative to the screen, the shape of one of the two bendable parts 2 is triangular, and the shape of the other of the two bendable parts 2 is trapezoidal.

In another embodiment, the hard body 1 is disposed in parallel with the screen, that is, horizontally or vertically, and the mode is inconvenient when it is used without tilting, so the tilt is set as a preferred embodiment.

The hard body 1 has a band shape.

In this embodiment, the inner or the surface of the two bendable parts is provided with flexible components or small components. Such as flexible wires, flexible batteries or some smaller components.

In this embodiment, as shown in FIG. 3 to FIG. 10, one end of the hard body 1 is provided with a camera 4. When in use, the camera 4 can be used for scanning and photographing.

Preferably, the camera 4 is photographed toward the longitudinal direction of the hard body 1. The photographing direction of the camera 4 is consistent with the direction pointed by the wrist, and it is more convenient to take a photo or scan a code.

Preferably, the camera 4 is disposed at a corner of the hard body. Such an arrangement can prevent the viewing angle of the camera 4 from being blocked. It allows the user to clearly see the actual progress of shooting, scanning, etc. from the screen of the mobile phone while doing shooting, scanning, etc. Different from the existing camera 4, which is generally installed on the back of the screen of the mobile phone, this hands-free form is very suitable for scanning code operations such as scanning QR codes, etc. which greatly improves the human body movement of electronic payment.

In this embodiment, as shown in FIG. 3-10, one end of the hard body 1 is provided with a lighting source 5. It can play the role of flashlight or night lighting.

Preferably, the lighting source 5 is disposed at a corner of the hard body. This position is not easily obscured by the palm or back of the hand. When using the flashlight, the direction of the flashlight is consistent with the direction of the "wrist/arm" of the human body.

As shown in FIG. 3-10, a wearable device includes:
the display terminal of any of the above embodiments,
a wearable part 6;
the hard body 1 is mounted on the wearable part 6.

The wearable part 6 is of an annular structure, and the longitudinal direction of the hard body 1 is parallel to the axis of the wearable part 6.

The display terminal and the wearable device provided by the present invention are described in detail above. The description of the specific embodiments is only to assist in understanding the method of the present invention and its core idea. It should be noted that those skilled in the art can make several improvements and modifications to the present invention without departing from the principles of the present invention. These modifications and modifications are also within the scope of the claims of the present invention.

What is claimed is:

1. A display terminal, comprising:
   a hard body, configured to mount components;
   two bendable parts, respectively located on two sides of the hard body and spliced on a plane to form a bendable body;
   a flexible display, covering the outer surface of the hard body and the bendable body;
   wherein the hard body is disposed obliquely with respect to a rectangular side of the flexible display, and the shape of the two bendable parts are all triangular or trapezoidal, or the shape of one of the two bendable parts is triangular, the shape of the other is trapezoidal.

2. The display terminal according to claim 1, wherein the flexible display is rectangular when the bendable part is not bent.

3. The display terminal according to claim 1, wherein the hard body has a band shape.

4. The display terminal according to claim 3, wherein one end of the hard body or a corner of one end of the hard body is provided with a camera or a lighting source, and the camera photographs toward any direction or the longitudinal direction of the hard body.

5. The display terminal according to claim 1, wherein the bendable part is made of plastic or metal.

6. The display terminal according to claim 1, wherein the inner or the surface of the two bendable parts is provided with flexible components or small components.

7. A wearable device, comprising:
   a display terminal, comprising: a hard body which is configured to mount components, two bendable parts which is respectively located on two sides of the hard body and spliced on a plane to form a bendable body, and a flexible display which covers the outer surface of the hard body and the bendable body;
   a wearable part;
   the hard body is mounted on the wearable part.

8. The wearable device according to claim 7, wherein the wearable part is of an annular structure and the longitudinal direction of the hard body is parallel to the axis of the wearable part.

9. The wearable device according to claim 7, wherein the flexible display is rectangular when the bendable part is not bent.

10. The wearable device according to claim 7, wherein the hard body is disposed obliquely with respect to a rectangular side of the flexible display, and the shape of the two bendable parts are all triangular or trapezoidal, or the shape of one of the two bendable parts is triangular, the shape of the other is trapezoidal.

11. The wearable device according to claim 10, wherein the hard body has a band shape.

12. The wearable device according to claim 11, wherein one end of the hard body or a corner of one end of the hard body is provided with a camera or a lighting source, and the camera photographs toward any direction or the longitudinal direction of the hard body.

13. The wearable device according to claim 7, wherein the bendable part is made of plastic or metal, or the bendable part is a memory plastic, a memory metal or a memory alloy.

14. The wearable device according to claim 7, wherein the inner or the surface of the two bendable parts is provided with flexible components or small components.

15. A display terminal, comprising:
a hard body, configured to mount components;
two bendable parts, respectively located on two sides of the hard body and spliced on a plane to form a bendable body;
a flexible display, covering the outer surface of the hard body and the bendable body wherein the bendable part is a memory plastic, a memory metal or a memory alloy.

16. The display terminal according to claim 15, wherein the flexible display is rectangular when the bendable part is not bent.

17. The display terminal according to claim 15, wherein the hard body is disposed obliquely with respect to a rectangular side of the flexible display, and the shape of the two bendable parts are all triangular or trapezoidal, or the shape of one of the two bendable parts is triangular, the shape of the other is trapezoidal.

18. The display terminal according to claim 17, wherein the hard body has a band shape.

19. The display terminal according to claim 18, wherein one end of the hard body or a corner of one end of the hard body is provided with a camera or a lighting source, and the camera photographs toward any direction or the longitudinal direction of the hard body.

20. The display terminal according to claim 15, wherein the inner or the surface of the two bendable parts is provided with flexible components or small components.

* * * * *